United States Patent [19]

Sakakibara et al.

[11] Patent Number: 5,419,993
[45] Date of Patent: May 30, 1995

[54] POLYAMIDE, ELECTROPHOTOGRAPHIC PHOTOSENSITIVE MEMBER EMPLOYING THE POLYAMIDE, AND ELECTROPHOTOGRAPHIC APPARATUS, DEVICE UNIT AND FACSIMILE MACHINE EMPLOYING THE MEMBER

[75] Inventors: Teigo Sakakibara, Yokohama; Kiyoshi Sakai, Hachioji; Takashi Koyama; Noriko Ohtani, both of Yokohama, all of Japan

[73] Assignee: Canon Kabushiki Kaisha, Tokyo, Japan

[21] Appl. No.: 874,833

[22] Filed: Apr. 28, 1992

[30] Foreign Application Priority Data

Nov. 1, 1991 [JP] Japan .................................. 3-313508

[51] Int. Cl.$^6$ .............................................. G03G 5/14
[52] U.S. Cl. ........................................ 430/62; 430/65; 358/300
[58] Field of Search ...................... 430/58, 60, 62, 64, 430/65; 355/211; 358/300

[56] References Cited

U.S. PATENT DOCUMENTS

| | | | |
|---|---|---|---|
| 4,495,263 | 1/1985 | VanderValk | 430/60 |
| 4,895,782 | 1/1990 | Koyama et al. | 430/58 |
| 5,071,723 | 12/1991 | Koyama et al. | 430/60 |
| 5,079,117 | 1/1992 | Koyama et al. | 430/58 |
| 5,104,757 | 4/1992 | Koyama et al. | 430/60 |
| 5,114,814 | 5/1992 | Sakoh et al. | 430/46 |

FOREIGN PATENT DOCUMENTS

| | | |
|---|---|---|
| 46-4734 | 11/1971 | Japan . |
| 48-26141 | 4/1973 | Japan . |
| 48-30936 | 4/1973 | Japan . |
| 49-10044 | 1/1974 | Japan . |
| 51-126149 | 11/1976 | Japan . |
| 52-10138 | 1/1977 | Japan . |
| 52-20836 | 2/1977 | Japan . |
| 52-25638 | 2/1977 | Japan . |
| 52-100240 | 8/1977 | Japan . |
| 53-48523 | 5/1978 | Japan . |
| 53-89435 | 8/1978 | Japan . |
| 54-26738 | 2/1979 | Japan . |
| 55-103556 | 8/1980 | Japan . |
| 55-143564 | 11/1980 | Japan . |
| 56-60448 | 5/1981 | Japan . |
| 57-90639 | 6/1982 | Japan . |
| 58-95351 | 6/1983 | Japan . |
| 58-106549 | 6/1983 | Japan . |

*Primary Examiner*—John Goodrow
*Attorney, Agent, or Firm*—Fitzpatrick, Cella, Harper & Scinto

[57] ABSTRACT

An electrophotographic photosensitive member, has an electroconductive support, an interlayer, and a photosensitive layer provided in the order named. The interlayer contains a polyamide having a structural unit represented by the formula (I) below:

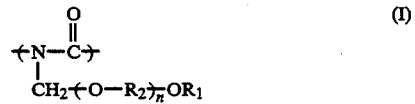

wherein $R_1$ is a substituted or unsubstituted alkyl group, $R_2$ is a substituted or unsubstituted alkylene group, and n is an integer of one or more.

14 Claims, 1 Drawing Sheet

POLYAMIDE, ELECTROPHOTOGRAPHIC PHOTOSENSITIVE MEMBER EMPLOYING THE POLYAMIDE, AND ELECTROPHOTOGRAPHIC APPARATUS, DEVICE UNIT AND FACSIMILE MACHINE EMPLOYING THE MEMBER

BACKGROUND OF THE INVENTION

1. Field of the Invention

The present invention relates to a polyamide of a novel structure and en electrophotographic photosensitive member which has an interlayer containing the polyamide.

The present invention also relates to an electrophotographic apparatus, a device unit, and a facsimile machine employing the electrophotographic photosensitive member.

2. Related Background Art

In repeated use of a Carlson type electrophotographic photosensitive member, one of the important characteristics of the member for stably obtaining high-quality images is the stability of the dark area potential and the light area potential. Therefore, improvement of carrier injection efficiency, improvement of adhesiveness of the photosensitive layer to the support, improvement of coating properties of the photosensitive layer, and provision of an interlayer between a support and a photosensitive layer to cover defects on the support have been proposed.

Known materials useful for the interlayer include polyamides (JP-A-Sho-46-47344 (The term "JP-A" as used herein means a Japanese Patent Laid-Open Application), JP-A-Sho-52-25638, and JP-A-Sho-58-95351), polyesters (JP-A-Sho-52-20836 and JP-A-54-26738), polyurethans (JP-A-Sho-49-10044 and JP-A-Sho-53-89435), casein (JP-A-Sho-55-103556), polypeptides (JP-A-Sho-53-48523), polyvinyl alcohol (JP-A-Sho-52-100240), polyvinylpyrrolidone (JP-A-Sho-48-30936), vinyl acetate-ethylene copolymers (JP-A-Sho-48-26141), maleic anhydride ester copolymers (JP-A-Sho-52-10138), polyvinylbutyral (JP-A-Sho-57-90639 and JP-A-Sho-58-106549), quaternary ammonium-containing polymers (JP-A-Sho-51-126149 and JP-A-Sho-56-60448) and ethylcellulose (JP-A-Sho-55-143564), and so forth.

The interlayer comprising the above-mentioned material, however, has the resistance susceptible to temperature and humidity, so that the stability of potential characteristics and high quality of images cannot always be achieved over environmental conditions of from low temperature and low humidity to high temperature and high humidity.

For example, at low temperature and low humidity, the resistance of the interlayer tends to become high, which may cause rise of a light-area potential or a residual potential on repeated use of the photosensitive member, thereby causing instability of image quality such as occurrence of fogging (in positive development), and fall of image density (in reversal development).

On the other hand, at high temperature and high humidity, the resistance of the interlayer tends to become low, which may cause lowering of the barrier function to increase the carrier injection from the support side and to lower the dark area potential, thereby causing black spot-like defects or fogging of the image.

SUMMARY OF THE INVENTION

An object of the present invention is to provide a polyamide which has a novel structure and has a stable resistivity independently of environmental conditions.

Another object of the present invention is to provide an electrophotographic photosensitive member which has stable potential characteristics and capable of giving stable images over a variety of environmental conditions of from low temperature and low humidity to high temperature and high humidity.

A further object of the present invention is to provide an electrophotographic apparatus, a device unit, and a facsimile machine employing the electrophotographic photosensitive member.

The present invention provides polyamide having a structural unit represented by the formula (I) below:

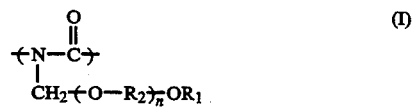

wherein $R_1$ is a substituted or unsubstituted alkyl group, $R_2$ is a substituted or unsubstituted alkylene group, and n is an integer of one or more.

The present invention also provides an electrophotographic photosensitive member, comprising an electroconductive support, an interlayer, and a photosensitive layer provided in this order, the interlayer containing a polyamide having a structural unit represented by the formula (I) below:

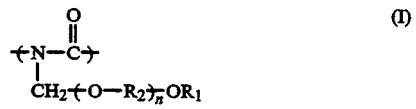

wherein $R_1$ is a substituted or unsubstituted alkyl group, $R_2$ is a substituted or unsubstituted alkylene group, and n is an integer of one or more.

The present invention further provides an electrophotographic apparatus, a device unit, and a facsimile machine employing the above-specified electrophotographic photosensitive member.

DESCRIPTION OF THE PREFERRED EMBODIMENT

Figure 1:
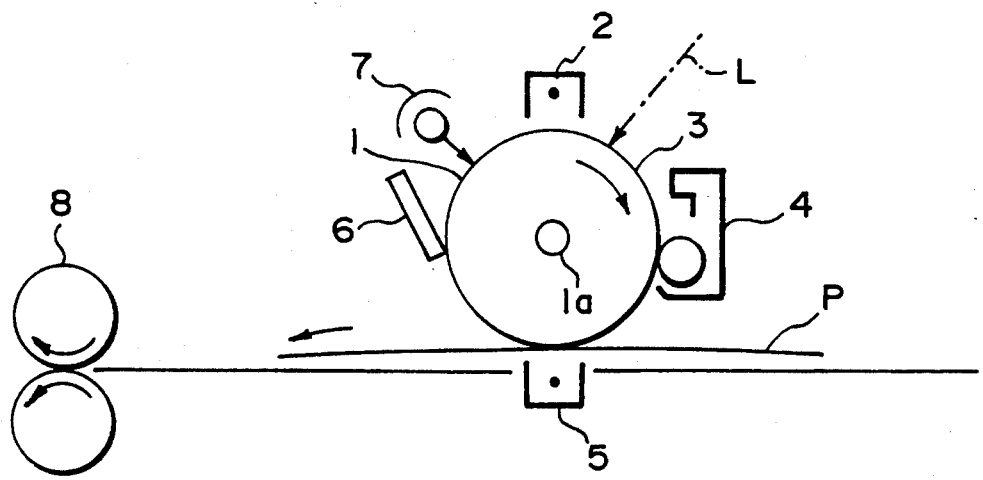
FIG. 1 illustrates roughly the constitution of an electrophotographic apparatus employing the photosensitive member of the present invention.

The polyamide of the present invention has a structural unit represented by the formula (I):

wherein $R_1$ is a substituted or unsubstituted alkyl group, $R_2$ is a substituted or unsubstituted alkylene group, and n is an integer of one or more.

In the formula (I), the alkyl group represented by $R_1$ includes methyl, ethyl, propyl, etc., and the alkylene group represented by R includes methylene, ethylene, propylene, isopropylene, etc. The alkyl group and the alkylene group may have a substituent such as a halogen atom, an aryl group such as phenyl, an alkoxy group, and the like.

The polyamide of the present invention is derived by substituting the hydrogen of the amide group of a polyamide resin as the main chain by a substitution reaction to form a modified polyamide having the structural unit represented by the formula (i).

The polyamide constituting the main chain of the modified polyamide of the present invention includes nylon resins such as 6, 11, 12, 66, and 610, copolymer nylon resins containing the units of the above resins, N-alkoxymethylated or N-alkylated nylon resins, aromatic component-containing nylon resins, and so forth.

The modified polyamide of the present invention may be crosslinked to be resistant to a paint solvent for photosensitive layer. The crosslinking is usually practiced by heat treatment after coating film formation by use of an epoxy compound, a melamine compound, or the like. In the case where an N-alkoxymethylated nylon resin is used as the polyamide component, the crosslinking may be caused by self-crosslinking by heating with an acid catalyst such as citric acid, adipic acid, tartaric acid, maleic acid, phosphoric acid and hypophosphorus acid without crosslinking agent.

The component of the main chain in the polyamide of the present invention is exemplified by the polymers having a structural unit as shown below, and the copolymers having two or more kinds of the structural units shown below:

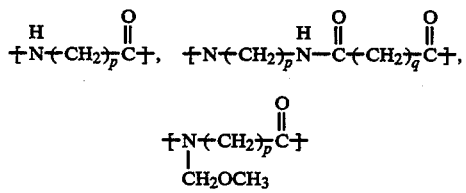

(p and q represent respectively an integer of one or more).

Specific examples of the main chain components are listed below:

| Examples of Components of Polyamide Main Chain | | | |
|---|---|---|---|
| Component example | Kind of resin | Weight-average molecular weight | Remark |
| I | 6-nylon | 95,000 | |
| II | 6, 66, 610 copolymer nylon | 150,000 | Component ratio (by weight) 6/66/610 = 1/1/1 |
| III | 6, 12, 66, 610 copolymer nylon | 120,000 | Component ratio (by weight) 6/12/66/610 = 2/1/2/2 |
| IV | N-methoxy-methylated 6-nylon | 210,000 | Methoxymethyl substitution ratio: 10 mol % |

Specific examples of preferred polyamides of the present invention are shown below without limiting the invention thereto.

The electrophotographic photosensitive member of the present invention contains the aforementioned modified polyamide resin in the interlayer, thereby being capable of preventing variation of the properties caused by variation of environmental conditions, such as rise of a residual potential at low temperature and low humidity, and lowering of a barrier function and the resulting fall of a dark area potential.

The modified polyamide of the present invention has a volume resistance which is affected little by variation of environmental conditions. Therefore, the use of this resin in the interlayer enables preparation of an electrophotographic photosensitive member which has characteristics affected extremely little by variation of environmental conditions. The resistance of an ordinary polyamide may be lower by three decimals at a high temperature and a high humidity than that at ordinary temperature and ordinary humidity. On the contrary, the resistance of the modified polyamide of the present invention is affected only little by temperature and humidity.

The reasons why the properties of the modified polyamide of the present invention affected little by environmental variation are considered as below, although they are not proved.

(1) The polymer having a side chain is more readily transformed into an amorphous state or a network structure of the polymer than the linear polymer to obtain a high ability of retaining an electroconductive substance such as water, ion, and the like in the interior of the coating film formed, and forms a satisfactory film which is unlikely to cause film defects such as a pinhole.

(2) The polar group at the side chain promotes adsorption of water, ionic substance, etc., and improves adhesiveness of the film.

It is considered that from the above two factors the resistance does not rise even at a low temperature and a low humidity, and the amorphous structure having a network prevents excessive incorporation of water or the like to improve the film-forming properties and to cause no remarkable decrease of the resistance even at high temperature and high humidity.

The modified polyamide of the present invention can be synthesized by reacting a polyamide as a starting material with e polyaldehyde and an alcohol to introduce a substituent in place of a hydrogen of the amido group.

A specific Synthesis Example of a modified polyamide of the present invention is described below.

SYNTHESIS EXAMPLE 1

(EXEMPLIFIED COMPOUND [1])

In a mixed solvent composed of 250 g of formic acid and 250 g of acetic anhydride, 50 g of 6-nylon resin was dissolved by agitation. Thereto, 15 g of paraformaldehyde and 35 g of 2-methoxyethanol were added, and the mixture was heated and reacted at 60° C. for 5 hours. The reacted solution was cooled to room temperature and was poured into 5 liters of acetone to precipitate the reaction product. The precipitated white product was collected by filtration. The resulting product was agitated and washed in a large amount of water. The product was then collected by filtration and vacuum-dried at 40° C. under a reduced pressure of from 10 to 20 mmHg to obtain 50.7 g of methoxyethoxymethylated 6-nylon resin (methoxyethoxymethyl substitution ratio: 31%). The interlayer of the present invention may be constituted solely of the modified polyamide, or may further contain another resin, an additive, an electroconductive substance, or the like. The resin which may be contained additionally in the interlayer includes polyamides such as copolymer nylon and N-alkoxymethylated nylon, polyesters, polyurethanes, polyureas, and phenol resins. The additive includes powdery materials such as titanium oxide, alumina, and resins, surface active agents, leveling agents, and coupling agents.

The electroconductive substance includes powder, foil, and staple fiber of metals such as aluminum, copper, nickel and silver; electroconductive metal oxides and solid solutions thereof such as antimony oxide, indium oxide, and tin oxide; electroconductive polymer materials such as polypyrrole, polyaniline and polyelectrolytes; carbon fiber; carbon black; graphite powder; and electroconductive powdery material coated with the aforementioned electroconductive substance. From among these, electroconductive metal oxides are preferred.

The thickness of the interlayer of the present invention is selected, in consideration of the electrophotographic characteristics and defects on the support, within the range of from about 0.1 $\mu$m to 50 $\mu$m, usually and preferably from 0.5 to 5 $\mu$m, and when an electroconductive substance is added, preferably from 1 to 30 $\mu$m. The interlayer may be formed by a coating method such as immersion coating, spray coating, roll coating, and other coating methods.

A second interlayer mainly constituted of a resin may be provided on the interlayer of the present invention, if necessary for control of a barrier function or for other purpose. The resin material for the second interlayer includes polyamides, polyesters, polyurethanes, polyurea, and phenol resins as well as the modified polyamides of the present invention. The second interlayer has preferably a thickness of from 0.1 to 5 $\mu$m, and may be formed by coating in a manner similar to the aforementioned interlayer.

The photosensitive layer in the present invention may be a monolayer type photosensitive layer which contains both a charge-generating substance and a charge-transporting substance in one and the same layer, or otherwise may be a lamination type photosensitive layer which is constituted of functionally separated layers comprising a charge-generating layer containing a charge-generating substance and a charge-transporting layer containing a charge-transporting substance. The charge-generating layer can be formed by application and drying of a dispersion of a charge-generating substance in a binder resin. The charge-generating substance includes azo pigments such as Sudan Red and Dian Blue; quinone pigments such as pyrene quinone and anthanthorone; quinocyanine pigments; perylene pigments; indigo pigments such as indigo and thioindigo; azulenium salts; phthalocyanine pigments such as copper phthalocyanine and oxytitanium phthalocyanine, and the like. The binder resin includes polyvinylbutyral, polystyrene, polyvinyl acetate, acrylic resins, polyvinylpyrrolidone, ethylcellulose, cellulose acetate butyrate, and the like. The charge-generating layer may be formed also by vapor deposition of the above-mentioned charge-generating substance. The thickness of the charge-generating layer is preferably not more than 5 $\mu$m, more preferably in the range of from 0.05 to 2 $\mu$m.

The charge-transporting layer can be formed by application and drying of a coating liquid prepared by dissolving a charge-transporting substance in a film-forming resin. The charge-transporting substance includes polycyclic aromatic compounds having a structure of biphenylene, anthracene, pyrene, phenanthrene, or the like in the main chain or the side chain thereof; nitrogen-containing cyclic compounds such as indole, carbazole, oxadiazole and pyrazoline; hydrazone compounds; styryl compounds; and the like. The charge-transporting layer is prepared in the manner above, because the charge-transporting substance is generally of a low molecular weight and has poor film-forming properties by itself. The film-forming resin includes polyesters, polycarbonates, polymethacrylate esters, polystyrenes, etc. The thickness of the charge-transporting layer is preferably in the range of from 5 to 40 $\mu$m, more preferably from 10 to 30 $\mu$m.

Furthermore, the photosensitive layer in the present invention includes organic photoconductive polymer layers composed of polyvinylcarbazole, polyvinylanthracene, etc., selenium vapor deposition layers, selenium-tellurium vapor deposition layers, amorphous silicon layers, and the like.

The charge-generating layer may be provided on the charge-transporting layer, or otherwise the charge-transporting layer may be provided on the charge-generating layer.

The monolayer type photosensitive layer can be formed by application and drying of a coating liquid prepared by dispersing and dissolving the aforementioned charge-generating substance and the charge-transporting substance in the aforementioned binder resin. The thickness of the photosensitive layer is preferably in the range of from 5 to 40 $\mu$m, more preferably from 10 to 30 $\mu$m.

The method of application of the photosensitive layer is similar to the method for the interlayer.

Further on the photosensitive layer, a simple resin layer or a resin layer containing the aforementioned electroconductive substance may be provided as a protecting layer in the present invention.

The electroconductive support in the present invention may be made of any material that is electroconductive, including metals and alloys such as aluminum, copper, chromium, nickel, zinc, stainless steel, etc.; laminates of metal foil such as of aluminum and copper with a plastic film; plastic films having aluminum, indium oxide, tin oxide, or the like vapor-deposited thereon; metals, plastics, and paper sheets having an electroconductive layer formed by application and drying of an electroconductive substance solely or with a binder resin; and so forth.

The electroconductive substance for the electroconductive layer includes powder, foil, and staple fiber of metals such as aluminum, copper, nickel and silver; electroconductive metal oxides and solid solutions thereof such as antimony oxide, indium oxide, and tin oxide; electroconductive polymer materials such as polypyrrole, polyaniline, and polymer electrolytes; carbon fiber; carbon black; graphite powder; organic and inorganic electrolytes; and electroconductive powdery material prepared by coating with the aforementioned electroconductive substance; and so forth.

The binder resin for the electroconductive layer includes thermoplastic resins such as polyamides, polyesters, acrylic resins, polyvinyl acetate resins, polycarbonates, polyvinylformal resins, polyvinylbutyral resins, polyvinyl alkyl eters, polyalkylene ethers, and polyurethane elastomers, and thermosetting resins such as thermosetting polyurethanes, phenol resins, and epoxy resins.

The mixing ratio of the electroconductive substance to the binder resin is in the range of from 5:1 to 1:5. The mixing ratio is selected in consideration of the resistivity, surface properties, coating properties, and other properties of the electroconductive layer.

If the electroconductive substance is powdery., the mixture is prepared in a conventional manner by means of a ball mill, a roll mill, a sand mill, or the like.

Further, another additive such as a surfactant, a silane coupling agent, a titanate coupling agent, a silicone oil, and a silicone leveling agent may be added.

The electrophotographic photosensitive member of the present invention is not only useful for electrophotographic copying machines but also useful widely in electrophotographic fields including laser beam printers, CRT printers, LED printers, liquid crystal printers, electrophotographic engraving systems, and so forth.

FIG. 1 illustrates roughly an example of the constitution of an electrophotographic apparatus employing the photosensitive member of the present invention.

In FIG. 1, a drum type photosensitive member 1 serves as an image carrier, being driven to rotate around the axis 1a in the arrow direction at a predetermined peripheral speed. The photosensitive member 1 is charged positively or negatively at the peripheral face uniformly during the rotation by an electrostatic charging means 2, and then exposed to image-exposure light L (e.g. slit exposure, laser beam-scanning exposure, etc.) at the exposure portion 3 with an image-exposure means (not shown in the drawing), whereby electrostatic latent images are sequentially formed on the peripheral surface of the photosensitive member in accordance with the exposed image.

Thus formed electrostatic latent image is developed with a toner by a developing means 4. The toner-developed images are sequentially transferred by a transfer means 5 onto a surface of a transfer-receiving material P which is fed between the phptosensitive member 2 and the transfer means 5 synchronously with the rotation of the photosensitive member 1 from a transfer-receiving material feeder not shown in the drawing.

The transfer-receiving material P having received the transferred image is separated from the photosensitive member surface, and introduced to an image fixing means 8 for fixation of the image and sent out of the copying machine as a duplicate copy.

The surface of the photosensitive member 1, after the image transfer, is cleaned with a cleaning means 6 to remove any remaining un-transferred toner, and is treated for charge elimination with a pre-exposure means 7 for repeated use for image formation.

The generally employed charging means 2 for uniformly charging the photosensitive member 1 is a corona charging apparatus. The generally employed transfer means 5 is also a corona charging means. In the electrophotographic apparatus, two or more of the constitutional elements of the above described photosensitive member, the developing means, the cleaning means, etc. may be integrated into one device unit, which may be made demountable from the main body of the apparatus. For example, at least one of the charging means, the developing means, and the cleaning means is combined with the photosensitive member 1 into one device unit which is demountable from the main body of the apparatus by aid of a guiding means such as a rail in the main body of the apparatus. An electrostatic charging means and/or a developing means may be combined with the aforementioned device unit.

In the case where the electrophotographic apparatus is used as a copying machine or a printer, the light L for optical image exposure may be projected onto the photosensitive member as reflected light or transmitted light from an original copy, or otherwise the information read out by a sensor from an original may be signalized, and according to the signalized information light is projected onto a photosensitive member, by scanning with a laser beam, driving an LED array, or driving a liquid crystal shutter array.

Figure 2:
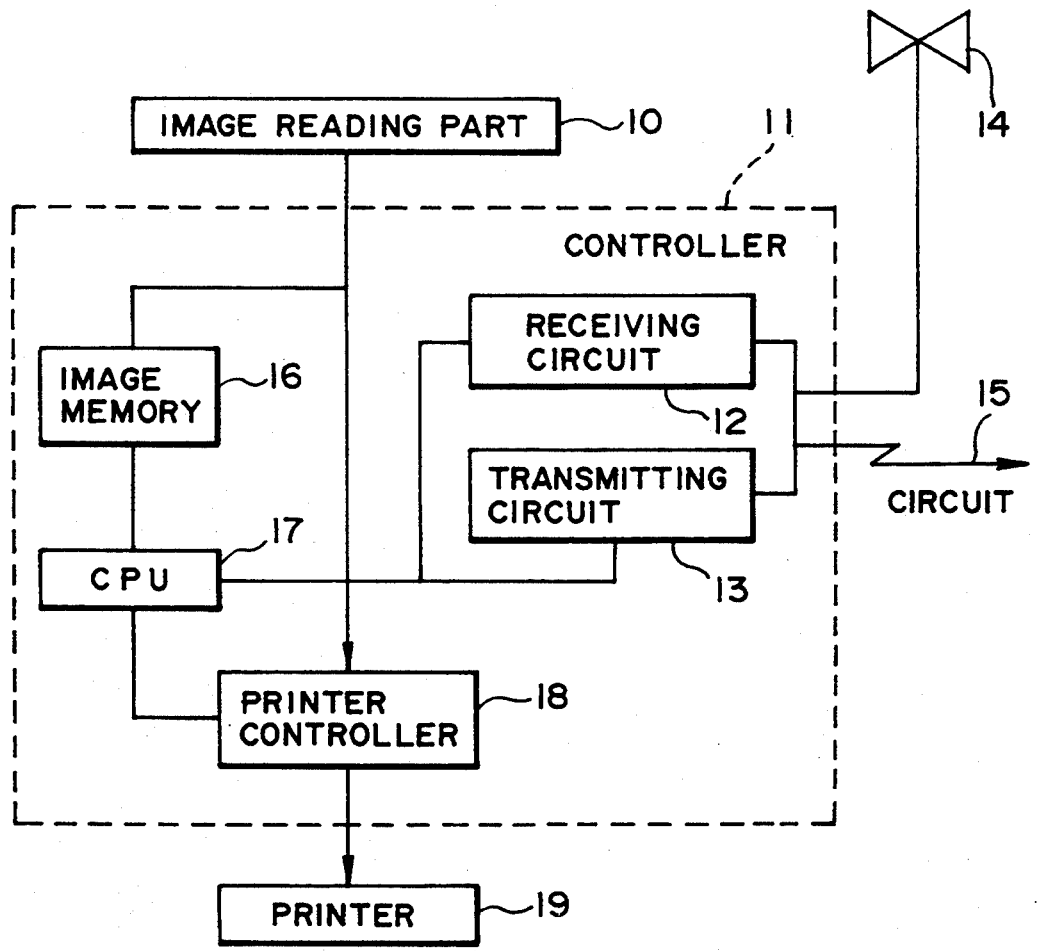
FIG. 2 illustrates an example of a block diagram of a facsimile system employing the photosensitive member of the present invention.

In the case where the electrophotographic apparatus is used as a printer of a facsimile machine, the optical image exposure light L is for printing the received data. FIG. 2 is a block diagram of an example of this case.

A controller 11 controls the image-reading part 10 and a printer 19. The entire of the controller 11 is controlled by a CPU 17. Readout data from the image reading part 10 is transmitted through a transmitting circuit 13 to the other communication station. Data received from the other communication station is transmitted through a receiving circuit 12 to a printer 19. The image data is stored in image memory 16. A printer controller 18 controls a printer 19. The numeral 14 denotes a telephone set.

The image received through a circuit 15, namely image information from a remote terminal connected through the circuit, is demodulated by the receiving circuit 12, treated for decoding of the image information in CPU 17, and successively stored in the image memory 16. When at least one page of image information has been stored in the image memory 16, the images are recorded in such a manner that the CPU 17 reeds out the one page of image information, and sends out the decoded one page of information to the printer controller 18, which controls the printer 19 on receiving the one page of information from CPU 17 to record the image information.

During recording by the printer 19, the CPU 17 receives the subsequent page of information.

Images are received and recorded in the manner as described above.

The present invention is described in more detail by reference to Examples. The term "part" as the unit in Examples is based on weight.

EXAMPLE 1

(Synthesis of a polyamide modified by $HOCH_2CH_2OCH_3$)

In a 2-liter autoclave, 100 g of 6-nylon, 376 g of methylcellosolve, and 80 g of paraformaldehyde were placed and were stirred at 120° C., thereby the starting 6-nylon being dissolved.

Thereto, a mixture of 25 g of methylcellosolve and 1 g of phosphoric acid was added, and the reaction was allowed to proceed at 120° C. for 45 minutes. The reaction mixture was poured into water, and left standing overnight. The resulting resin in a viscous lump state was taken out and crushed. The crushed resin was washed with an alkaline solution and repeatedly with water, and was air-dried. Then the resin was dissolved in 200 g of methanol. After the insoluble matter was eliminated by filtration, the resin solution was poured into water. The solidified resin was crushed, and was washed with water repeatedly until the formaldehyde became undetectable by Schiff's reagent, and was then dried. Thus 80 g of dried resin was obtained. The modification ratio was 30% The resin was subjected to IR spectrum measurement and NMR spectrum measurement, and the characteristic data as below were obtained.

IR spectrum (cm$^{-1}$): 1050–1100 (—C—O—C—)
$^{13}$C-NMR spectrum (ppm): 78 (—N—CH$_2$O—)
65, 68 (—O—CH$_2$—)
58 (—O—CH$_3$)

The surface resistivity of the resulting modified polyamide was measured according to JIS K6911. The quantity of triboelectrfication was indicated by the saturated charging quantity measured at a load of 300 g.

The results are shown in Table 1.

EXAMPLE 2

(Synthesis of a polyamide modified by HOCH$_2$CH$_2$OC$_4$H$_9$)

A modified polyamide was prepared in an amount of 75 g at a modification ratio of 25% in the same manner as in Example 1 except that 100 g of 6-nylon, 100 g of paraformaldehyde, 400 g of butylcellosolve (total weight), and 2 g of phosphoric acid were used, and the reaction was conducted at a temperature of 140° C. for one hour.

$^{13}$C-NMR spectrum (ppm): 60–70 (—O—CH$_2$—)

The resulting modified polyamide was evaluated in the same manner as in Example 1. The results are shown in Table 1.

EXAMPLE 3

(Synthesis of a polyamide modified by HOCH$_2$CH$_2$OCH$_2$CH$_2$OC$_2$H$_5$)

A modified polyamide was prepared in an amount of 85 g at a modification ratio of 15% in the same manner as in Example 1 except that 100 g of 6-nylon, 300 g of diethyleneglycol monoethyl ether, 100 g of paraformaldehyde, and 4 g of phosphoric acid were used, and the reaction was conducted at a temperature of 130° C. for one hour. IR spectrum (cm$^{-1}$): 1050–1100 (—C—O—C—) $^{13}$C-NMR spectrum (ppm): 65, 68 (—O—CH$_2$—) 14 (—CH$_3$)

The resulting modified polyamide was evaluated in the same manner as in Example 1. The results are shown in Table 1.

EXAMPLE 4

(Synthesis of a polyamide modified by HOCH$_2$CH$_2$OCH$_2$—C$_6$H$_5$)

A modified polyamide was prepared in an amount of 80 g at a modification ratio of 15 in the same manner as in Example 1 except that 100 g of 6-nylon, 100 g of paraformaldehyde, 400 g of ethyleneglycol monobenzyl ether, and 4 g of phosphoric acid were used, and the reaction was conducted at a temperature of 160° C. for 2 hours.

IR spectrum (cm$^{-1}$): 1580 ( phenyl )

The resulting modified polyamide was evaluated in the same manner as in Example 1. The results are shown in Table 1.

EXAMPLE 5

(Synthesis of a polyamide modified by HOCH$_2$CH$_2$OCH$_2$CH$_2$OCH$_3$)

In a 1-liter autoclave, 100 g of 6-nylon, 250 g of diethyleneglycol monomethyl ether, and 100 g of paraformaldehyde were placed, and the mixture was stirred at 130° C. Thereto a mixture of 25 g of diethyleneglycol monomethyl ether and 4 g of phosphoric acid was charged, and the reaction was allowed to proceed at 130° C. for 60 minutes. The reaction mixture was poured into water, and the product was treated in the same manner as in Example 1. Consequently, 95 g of a modified polyamide was obtained at a modification ratio of 15%.

IR spectrum (cm$^{-1}$): 1050–1100 (—C—O—C—)
C-NMR spectrum (ppm): 78 (—N—CH$_2$O—)
65, 68 (—O—CH$_2$—)
58 (—O—CH$_3$ ) The resulting modified polyamide was evaluated in the same manner as in Example 1. The results are shown in Table 1.

COMPARATIVE EXAMPLE 1

The modified polyamide obtained by using methoxymethylated nylon was evaluated in the same manner as in Example 1. The results are shown in Table 1.

COMPARATIVE EXAMPLE 2

The modified polyamide obtained by using 6,66-nylon was evaluated in the same manner as in Example 1. The results are shown in Table 1.

EXAMPLE 6

A paint for the electroconductive layer was prepared by dispersing 50 parts of electroconductive titanium oxide powder coated with tin oxide containing 10% of antimony oxide, 25 parts of phenol resin, 20 parts of methylcellosolve, 5 parts of methanol, and 0.002 part of silicone oil (polydimethylsiloxane-polyoxyalkylene copolymer, average molecular weight 3,000) by means of a sand mill employing glass beads of 1 mm diameter for 2 hours.

Onto an aluminum cylinder (30 mm diameter, 260 mm long), the above paint was applied by immersion coating, and the coating was dried at 140° C. for 30 minutes to form an electroconductive layer of 20 μm thick.

A paint for an interlayer was prepared by dissolving 5 parts of the resin of aforementioned Resin Example [1] in 95 parts of methanol. This paint was applied on the above electroconductive layer by immersion coating, and the resulting coating was dried at 90° C. for 10 minutes to form an interlayer of 0.6 μm thick.

A liquid dispersion for the charge-generating layer was prepared by dispersing 3 parts of the disazo pigment of the structural formula below:

(Formulas)

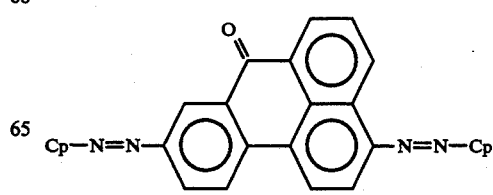

-continued

Cp =

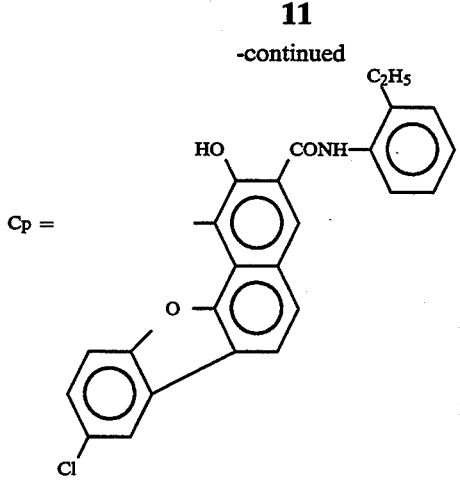

2 parts of polyvinylbenzal (benzalation degree: 75% weight-average molecular weight: 13,000), and 35 parts of cyclohexanone by means of a sand mill employing glass beads of 1 mm diameter for 8 hours, and then adding thereto 60 parts of methyl ethyl ketone (MEK). This liquid dispersion was applied on the above interlayer by immersion coating, and was dried at 80° C. for 20 minutes to form a charge-generating layer of 0.2 μm thick.

A paint for the charge-transporting layer was prepared by dissolving 10 parts of the styryl compound of the structural formula below:

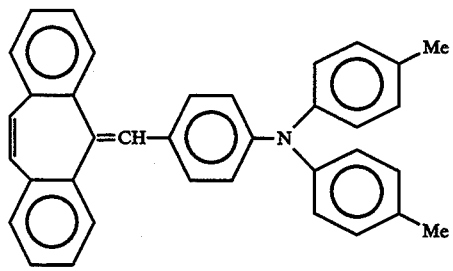

and 10 parts of polycarbonate (weight-average molecular weight: 46,000) in a mixed solvent of 10 parts of dichloromethane and 40 parts of monochlorobenzene. This paint was applied on the above charge-generating layer by immersion coating, and dried at 120° C. for 60 minutes to form a charge-generation layer of 18 μm thick.

The electrophotographic photosensitive member thus prepared was mounted on a laser printer of reversal development type which conducts printing through a cyclic process of charging-exposure-development-transfer-cleaning at a cycle time of 2.0 seconds, and the electrophotographic properties were evaluated at environmental conditions of normal temperature and normal humidity (23° C., 50%RH), and high temperature and high humidity (30° C., 85%RH).

As shown in Table 2, the photosensitive member of the present invention gave a large difference between the dark area potential ($V_D$) and the light area potential ($V_L$), resulting in a sufficient potential contrast, exhibiting a stable dark area potential ($V_D$) even at high temperature and high humidity, and thus giving satisfactory quality of images without black dot defects nor fogging.

EXAMPLES 7-10

Electrophotographic photosensitive members of Examples 7 to 10 were prepared in the same manner as in Example 6 except that the modified polyamide of Resin Examples [2], [3], [5] and [6] were used respectively in place of the Resin Example [1] for the paint for the interlayers.

The resulting photosensitive members were evaluated in the same manner as in Example 6. Any of the photosensitive member had a stable dark-area potential ($V_D$) even at high temperature and high humidity, and gave excellent images without a black dot defect nor fogging.

The results are shown in Table 2.

COMPARATIVE EXAMPLE 3

An electrophotographic photosensitive member was prepared in the same manner as in Example 6 except that N-methoxymethylated 6-nylon (weight-average molecular weight: 120,000, methoxymetyl substitution ratio: 33%) was used in place of the modified polyamide of the present invention for the paint for the interlayer.

The resulting photosensitive member was evaluated in the same manner as in Example 6. At high temperature and high humidity, the dark area potential ($V_D$) of the photosensitive member decreased, and black dot defects were observed in the images.

The results are shown in Table 2.

EXAMPLE 11

A paint for the interlayer was prepared by dissolving 5 parts of the resin of Resin Example [9] in 95 parts of methanol.

This resin was applied onto an aluminum cylinder (30 mm diameter, 360 mm long),and was dried at 100° C. for 20 minutes to form an interlayer of 1.2 μ'm thick.

A liquid dispersion for the charge-generating layer was prepared by dispersing 4 parts of oxytitanium phthalocyanine pigment, 3 parts of polyvinylbutyral (butyralation degree: 684, weight-average molecular weight: 24,000), and 34 parts of cyclohexanone by means of a sand mill employing glass beads of 1 mm diameter for 10 hours, and the adding thereto 60 parts of tetrahydrofuran (THF). This dispersion was applied on the above interlayer by immersion coating, and dried at 80° C. for 15 minutes to form a charge-generating layer of 0.15 μm thick.

A paint for a charge-transporting layer was prepared by dissolving 7 parts of the styryl compound 10 used in Example 6 and 10 parts of polycarbonate (weight-average molecular weight: 59,000) in a mixed solvent of 15 parts of dichloromethane and 45 parts of monochlorobenzene. This solution was applied on the above charge-generating layer by immersion coating, and was dried at 120° C. for 60 minutes to form a charge-transporting layer of 25 μm thick.

The electrophotographic photosensitive member thus prepared was mounted on a laser printer of a reversal development type which conducts printing through a cyclic process of charging-exposure-development-transfer-cleaning at a cycle time of 0.6 second, and the electrophotographic properties were evaluated at environmental conditions of low temperature and low humidity (15° C., 10%RH).

As shown in Table 3, this photosensitive member gave a large difference between the dark area potential ($V_D$) and the light area potential ($V_L$), resulting in a sufficient potential contrast. During 1000 sheets of continuous image formation, the rise of the light area potential ($V_L$) was little, and images were formed stably.

EXAMPLES 12-15

Electrophotographic photosensitive members of Examples 12 to 15 were prepared in the same manner as in Example 11 except that the modified polyamide of Resin Examples [10], [16], [29] and [33] were used respectively in place of the Resin Example [9] for the paint for the interlayers.

The resulting photosensitive members were evaluated in the same manner as in Example 11. Any of the photosensitive member gave a large difference between the dark area potential ($V_D$) and the light area potential ($V_L$), resulting in a sufficient potential contrast. During 1000 sheets of continuous image formation, the rise of the light area potential ($V_L$) was little, and images were formed stably.

The results are shown in Table 3.

COMPARATIVE EXAMPLE 4

An electrophotographic photosensitive member was prepared in the same manner as in Example 6 except that alcohol-soluble copolymer nylon (weight-average molecular weight: 66,000) was used for the paint for an interlayer in place of the modified polyamide of the present invention.

This photosensitive member was evaluated in the same manner as in Example 11. During 1000 sheets of continuous image formation, the light area potential ($V_L$) became higher and came to cause fogging.

The results are shown in Table 3

EXAMPLE 16

A paint for an interlayer was prepared by dispersing 25 parts of electroconductive titanium oxide powder coated with tin oxide containing 10% of antimony oxide, 20 parts of Futile type titanium oxide powder, 20 parts of the resin of the Resin Example [13], 20 parts of methanol, and 10 parts of 2-propanol by, means of a sand mill employing glass beads of 1 mm diameter for 4 hours.

Onto an aluminum cylinder (60 mm diameter, 260 mm long), the above paint was applied by immersion coating, and was dried at 160° C. for 30 minutes to form an interlayer of 16 μm thick.

A paint for a second interlayer was prepared by dissolving 5 parts of alcohol-soluble copolymer nylon (weight-average molecular weight: 66,000) in 95 parts of methanol. This paint was applied on the above interlayer by immersion coating, and was dried at 90° C. for 15 minutes to form a second interlayer of 0.3 μm thick.

A liquid dispersion for the charge-generating layer was prepared by dispersing 2 parts of the disazo pigment of the structural formula below:

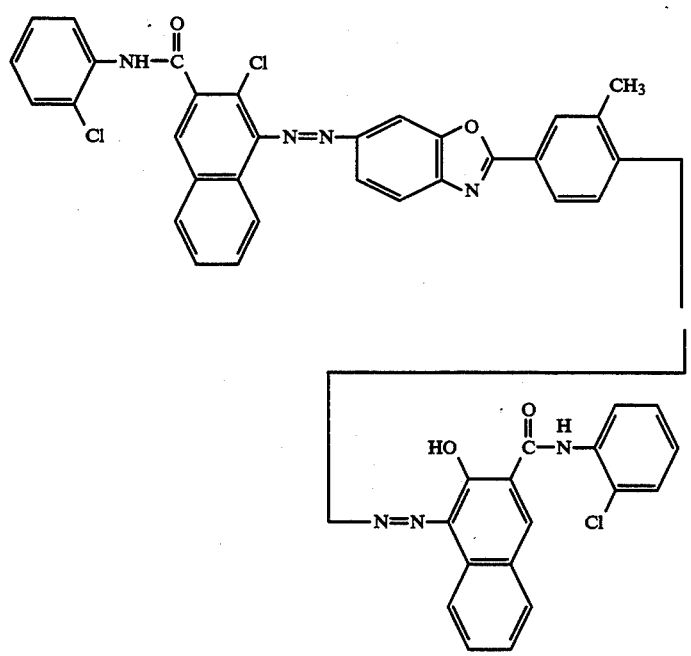

1 part of polyvinylbutyral (butyralation degree: 68%, weight-average molecular weight: 18,000), and 30 parts of cyclohexanone by means of a sand mill employing glass beads of 1 mm diameter for 20 hours, and adding thereto 65 parts of methyl ethyl ketone (MEK). This liquid dispersion was applied on the above second interlayer by immersion coating, and was dried at 80° C. for 20 minutes to form a charge-generating layer of 0.2 μm thick.

A paint for the charge-transporting layer was prepared by dissolving 9 parts of the hydrazone compound of the structural formula below:

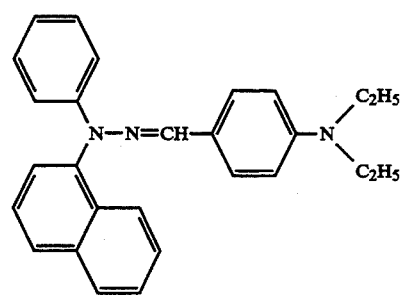

and 10 parts of polycarbonate (weight-average molecular weight: 46,000) in a mixed solvent of 20 parts of dichloromethane and 40 parts of monochlorobenzene. This paint was applied on the above charge-generating layer by immersion coating, and dried at 120° C. for 60 minutes to form a charge-transporting layer of 23 μm thick.

The electrophotographic photosensitive member thus prepared was mounted on a laser printer of reversal development type which conducts printing through a cyclic process of charging-exposure-development-transfer-cleaning at a cycle time of 0.8 seconds, and the electrophotographic properties were evaluated at environmental conditions of low temperature and low humidity (15° C., 10%RH).

As shown in Table 4, this photosensitive member gave a large difference between the dark area potential ($V_D$) and the light area potential ($V_L$), resulting in a sufficient potential contrast. During continuous 1000 sheets of image formation, the rise of the light area potential ($V_L$) was little, and satisfactory images were formed stably.

EXAMPLE 17

An electrophotographic photosensitive member was prepared through formation of an interlayer, a charge-generating layer, and a charge-transporting layer in the same manner as in Example 16 except that the second interlayer was not provided.

This photosensitive member was evaluated in the same manner as in Example 16. This photosensitive member gave a large difference between the dark area potential ($V_D$) and the light area potential ($V_L$), resulting in a sufficient potential Contrast. During continuous 1000 sheets of image formation, the rise of the light area potential ($V_L$) was little, and satisfactory images were formed stably.

The results are shown in Table 4.

COMPARATIVE EXAMPLES 5 and 6

Electrophotographic photosensitive members of Comparative Examples 5 and 6 were prepared in the same manner as in Examples 16 and 17 except that, in the paint for the interlayer containing electroconductive titanium oxide powder and rutile type titanium oxide powder, a phenol resin was used in place of the modified polyamide of Example 16.

These photosensitive members were evaluated in the same manner as in Example 16. As shown in Table 4, in Comparative Example 5, the light area potential ($V_L$) rises and the formed images came to be fogged during 1000 sheets of continuous copying. In Comparative Example 6 in which the charge-generating layer and the charge-transporting layer were directly provided on the interlayer, the barrier function of the interlayer was insufficient, therefore the charge injection from the support side being increased and the dark area potential ($V_D$) being lowered. Consequently potential contrast necessary for image formation could not be obtained.

| Resin Example | \<Main Chain\> Polyamide Resin Component | \<Side Chain\> Component of Modified Portion | Substitution Ratio for Modification (wt %) |
|---|---|---|---|
| 1 | I | | 31 |
| 2 | II | $-(N-C)-$ with side chain $CH_2-O-CH_2-CH_2-O-CH_3$ (N has C=O) | 27 |
| 3 | III | | 36 |
| 4 | IV | | 18 |
| 5 | | | 30 |
| 6 | I | | 34 |
| 7 | II | $-(N-C)-$ with side chain $CH_2-O-CH_2-CH_2-O-C_2H_5$ | 33 |
| 8 | III | | 15 |
| | IV | | |
| 9 | I | | 36 |
| 10 | II | | 39 |
| 11 | III | $-(N-C)-$ with side chain $CH_2-O-CH_2-CH_2-O-CH_2-CH_2-O-CH_3$ | 41 |
| 12 | IV | | 17 |
| 13 | I | | 33 |
| 14 | II | | 40 |
| 15 | III | $-(N-C)-$ with side chain $CH_2-O-CH_2-CH_2-O-CH_2-CH_2-O-C_2H_5$ | 35 |
| 16 | IV | | 16 |

-continued

| Resin Example | <Main Chain> Polyamide Resin Component | <Side Chain> Component of Modified Portion | Substitution Ratio for Modification (wt %) |
|---|---|---|---|
| 17 | I | ![structure]: +N(−)−C(=O)+ with N−CH₂−O−CH₂−O−CH₃ | 43 |
| 18 | II | (same as above) | 45 |
| 19 | III | (same as above) | 35 |
| 20 | IV | (same as above) | 19 |
| 21 | I | +N(−)−C(=O)+ with N−CH₂−O−CH₂−O−CH₂CH₃ | 35 |
| 22 | II | (same as above) | 31 |
| 23 | III | (same as above) | 31 |
| 24 | IV | (same as above) | 20 |
| 25 | I | +N(−)−C(=O)+ with N−CH₂−O−CH₂CH₂−O−CH₂−C₆H₅ | 31 |
| 26 | II | (same as above) | 24 |
| 27 | III | +N(−)−C(=O)+ with N−CH₂−O−CH₂−CH₂−O−CH₂CH₂Cl | 25 |
| 28 | IV | (same as above) | 17 |
| 29 | II | +N(−)−C(=O)+ with N−CH₂−O−CH₂CH₂−O−CH₂CH₂−O−CH₂−C₆H₅ | 15 |
| 30 | IV | (same as above) | 12 |
| 31 | III | +N(−)−C(=O)+ with N−CH₂−O−CH₂−CH(CH₃)−O−CH₂CH₃ | 23 |
| 32 | IV | (same as above) | 15 |
| 33 | III | +[N(−)−C(=O)]$_n$− with N−CH₂−O−CH₂CH₂−O−CH₃  and  +[N(−)−C(=O)]−  with N−CH₂−O−CH₂CH₂−O−CH₂−CH₂−O−CH₃;  $n:1 = 7:3$ (Molar ratio) | 35 |
| 34 | III | +[N(−)−C(=O)]$_n$− with N−CH₂−O−CH₂CH₂−O−CH₃  and  +[N(−)−C(=O)]−  with N−CH₂−O−CH₂CH₂−O−CH₂−CH₃ | 33 |

-continued

| Resin Example | <Main Chain> Polyamide Resin Component | <Side Chain> Component of Modified Portion | Substitution Ratio for Modification (wt %) |
|---|---|---|---|
| | | n:l = 8:2 (Molar ratio) | |

TABLE 1

| | Surface Resistivity (Ω) | | Tribo-electrification (V) | |
|---|---|---|---|---|
| | 23° C./ 55% rh | 23° C./ 15% rh | 23° C./ 55% rh | 23° C./ 15% rh |
| Example | | | | |
| 1 | 4.2 × 10⁹ | 5.1 × 10⁹ | 0 | 0 |
| 2 | 2.6 × 10⁹ | 9.8 × 10⁹ | 0 | 0 |
| 3 | 3.7 × 10⁹ | 2.1 × 10⁹ | 0 | 0 |
| 4 | 1.5 × 10⁹ | 2.2 × 10¹⁰ | 0 | 0 |
| 5 | 3.5 × 10⁹ | 2.0 × 10¹⁰ | 0 | 0 |
| Comparative Example | | | | |
| 1 | 4.5 × 10¹⁰ | 1.2 × 10¹² | 0 | 130 |
| 2 | 3.3 × 10¹³ | 1.2 × 10¹⁴ | 150 | 340 |

TABLE 2

| | 23° C., 50% RH | | 30° C., 85% RH | |
|---|---|---|---|---|
| | Dark Area Potential $V_D$ (−V) | Light Area Potential $V_L$ (−V) | Dark Area Potential $V_D$ (−V) | Image Quality |
| Example 6 | 670 | 190 | 645 | Good |
| Example 7 | 680 | 185 | 650 | Good |
| Example 8 | 680 | 175 | 635 | Good |
| Example 9 | 700 | 180 | 680 | Good |
| Example 10 | 670 | 175 | 645 | Good |
| Comparative Example 3 | 670 | 210 | 570 | Black-dotted |

TABLE 3

| | Initial Stage | | After Continuous 1000-sheet Copying | |
|---|---|---|---|---|
| | Dark Area Potential $V_D$ (−V) | Light Area Potential $V_L$ (−V) | Light Area Potential $V_L$ (−V) | Image Quality |
| Example 11 | 590 | 160 | 170 | Good |
| Example 12 | 610 | 165 | 170 | Good |
| Example 13 | 580 | 170 | 185 | Good |
| Example 14 | 580 | 155 | 170 | Good |
| Example 15 | 570 | 150 | 160 | Good |
| Comparative Example 4 | 600 | 180 | 330 | Fogging |

TABLE 4

| | Second Interlayer | Initial Stage | | After Continuous 1000-sheet Copying | |
|---|---|---|---|---|---|
| | | Dark Area Potential $V_D$ (−V) | Light Area Potential $V_L$ (−V) | Light Area Potential $V_L$ (−V) | Image Quality |
| Example 16 | Provided | 670 | 160 | 170 | Good |
| Example 17 | None | 650 | 160 | 175 | Good |
| Comparative Example 5 | Provided | 690 | 165 | 410 | Fogging |
| Comparative Example 6 | None | 200 | 30 | (Evaluation impracticable) | |

What is claimed is:

1. An electrophotographic photosensitive member, comprising an electroconductive support, an interlayer, and a photosensitive layer provided in the order named, said interlayer containing a polyamide having a structural unit represented by the formula (I) below:

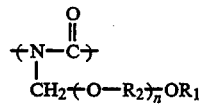

wherein $R_1$ is a substituted or unsubstituted alkyl group, $R_2$ is a substituted or unsubstituted alkylene group, and n is an integer of one or more.

2. An electrophotographic photosensitive member according to claim 1, wherein the polyamide has a crosslinked structure.

3. An electrophotographic photosensitive member according to claim 1, wherein the interlayer contains an electroconductive substance.

4. An electrophotographic photosensitive member according to claim 3, wherein the electroconductive substance is an electroconductive metal oxide.

5. An electrophotographic photosensitive member according to claim 1, wherein the electrophotographic photosensitive member comprises a second interlayer between the interlayer and the photosensitive member.

6. An electrophotographic photosensitive member according to claim 1, wherein the photosensitive layer is a monolayer.

7. An electrophotographic photosensitive member according to claim 1, wherein the photosensitive layer comprises a charge-generating layer and a charge-transporting layer.

8. An electrophotographic photosensitive member according to claim 7, wherein the electrophotographic photosensitive member has an electroconductive support, an interlayer, a charge-generating layer, and a charge-transporting layer provided in the order named.

9. An electrophotographic photosensitive member according to claim 7, wherein the electrophotographic photosensitive member has an electroconductive support, an interlayer, a charge-transporting layer, and a charge-generating layer provided in the order named.

10. An electrophotographic photosensitive member according to claim 1, wherein the electrophotographic photosensitive member has a protecting layer on the photosensitive layer.

11. An electrophotographic apparatus, comprising an electrophotographic photosensitive member, an image forming means for forming an electrostatic latent image, a developing means for developing the formed latent image, and a transferring means for transferring a developed image to a transfer-receiving material, said electrophotographic photosensitive member comprising an electroconductive support, an interlayer, and a photosensitive layer provided in the order named, the interlayer containing a polyamide having a structural unit represented by the formula (I) below:

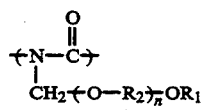

wherein $R_1$ is a substituted or unsubstituted alkyl group, $R_2$ is a substituted or unsubstituted alkylene group, and n is an integer of one or more.

12. A device unit comprising an electrophotographic photosensitive member, a charging means, and a cleaning means, said electrophotographic photosensitive member comprising an electroconductive support, an interlayer, and a photosensitive layer provided in the order named, the interlayer containing a polyamide having a structural unit represented by the formula (I) below:

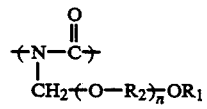

wherein $R_1$ is a substituted or unsubstituted alkyl group, $R_2$ is a substituted or unsubstituted alkylene group, and n is an integer of one or more, said unit holding integrally the electrophotographic photosensitive member, the charging means, and the cleaning means, and being demountable from the main body of an electrophotographic apparatus.

13. A device unit according to claim 12, wherein the device unit comprises a developing means.

14. A facsimile machine comprising an electrophotographic apparatus and an information-receiving means for receiving image information from a remote terminal, said electrophotographic apparatus comprising an electrophotographic photosensitive member, said electrophotographic photosensitive member comprising an electroconductive support, an interlayer, and a photosensitive layer provided in the order named, the interlayer containing a polyamide having a structural unit represented by the formula (I) below:

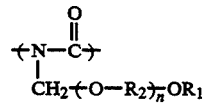

wherein $R_1$ is a substituted or unsubstituted alkyl group, $R_2$ is a substituted or unsubstituted alkylene group, and n is an integer of one or more.

* * * * *

UNITED STATES PATENT AND TRADEMARK OFFICE
CERTIFICATE OF CORRECTION

PATENT NO. : 5,419,993
DATED : May 30, 1995
INVENTOR(S) : TEIGO SAKAKIBARA, ET AL.

Page 1 of 3

It is certified that error appears in the above-identified patent and that said Letters Patent is hereby corrected as shown below:

COLUMN 1

Line 11, "en" should read --an--.

COLUMN 3

Line 3, "R" should read --$R_2$--.
Line 12, "formula (i)." should read --formula (I).--.

COLUMN 4

Line 20, "affected" should read --are affected--.
Line 49, "[1]" should read --[1])--.
Line 65, "The" should read --¶ The--.

COLUMN 5

Line 45, "The" should read --¶ The--.

COLUMN 7

Line 6, "powdery.," should read --powdery,--.
Line 39, "member 2" should read --member 1--.
Line 50, "un-transferred" should read --untransferred--.

COLUMN 8

Line 34, "reeds" should read --reads--.

COLUMN 9

Line 2, "30%" should read --30%.--.
Line 33, "$_{oc2}H_5$)" should read --$OC_2H_5$)--.

UNITED STATES PATENT AND TRADEMARK OFFICE
CERTIFICATE OF CORRECTION

PATENT NO. : 5,419,993
DATED : May 30, 1995
INVENTOR(S) : TEIGO SAKAKIBARA, ET AL.

It is certified that error appears in the above-identified patent and that said Letters Patent is hereby corrected as shown below:

COLUMN 9

Line 40, "IR" should read --¶ IR--.
Line 41, "$^{13}$C-NMR" should read --¶ $^{13}$C-NMR--.
Line 51, "15in" should read --15% in--.

COLUMN 10

Line 12, "C-NMR" should read --$^{13}$C-NMR--.
Line 14, "The" should read --¶ The--.
Line 36, "0,002 part" should read --0.002 part--.

COLUMN 11

Line 11, "  " should read    -- 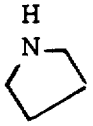 --.

Line 17, "75%" should read --75%,--.

COLUMN 12

Line 6, "member" should read --members--.
Line 16, "methoxymetyl" should read --methoxymethyl--.
Line 37, "684," should read --68%,--.
Line 46, "10" should be deleted.

UNITED STATES PATENT AND TRADEMARK OFFICE
CERTIFICATE OF CORRECTION

PATENT NO. : 5,419,993
DATED : May 30, 1995
INVENTOR(S) : TEIGO SAKAKIBARA, ET AL.

It is certified that error appears in the above-identified patent and that said Letters Patent is hereby corrected as shown below:

COLUMN 13

Line 11, "member" should read --members--.
Line 62, "Futile" should read --rutile--.
Line 64, "by," should read --by--.

Signed and Sealed this

Third Day of October, 1995

Attest:

BRUCE LEHMAN

*Attesting Officer*   *Commissioner of Patents and Trademarks*